G. W. BROOKS.
FIREPROOF BEAM.
APPLICATION FILED MAY 10, 1906.
928,935.  Patented July 27, 1909.
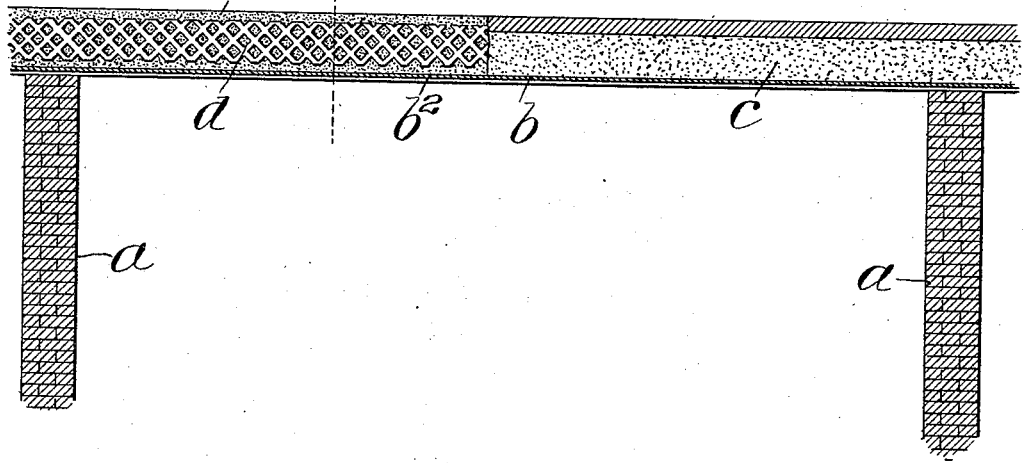
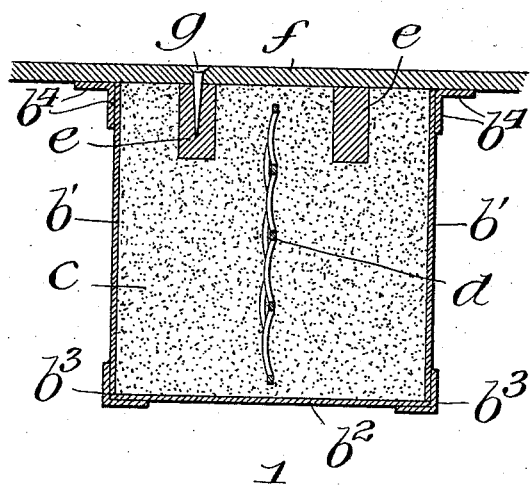
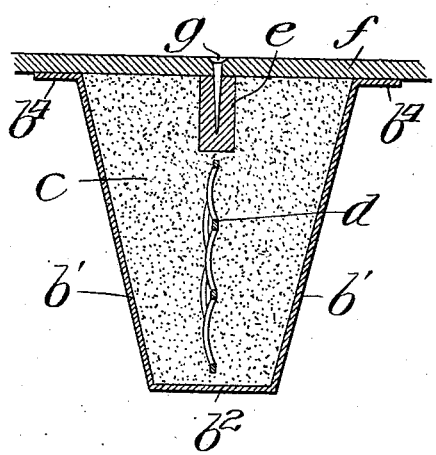
Witnesses:
Inventor:
George W. Brooks,
By Thomas F. Sheridan,
Atty.

UNITED STATES PATENT OFFICE.

GEORGE W. BROOKS, OF TOPEKA, KANSAS.

FIREPROOF BEAM.

No. 928,935.     Specification of Letters Patent.     Patented July 27, 1909.

Application filed May 10, 1906. Serial No. 316,118.

*To all whom it may concern:*

Be it known that I, GEORGE W. BROOKS, a citizen of the United States, residing at Topeka, in the county of Shawnee and State of Kansas, have invented certain new and useful Improvements in Fireproof Beams, of which the following is a specification.

My invention relates to beams or joists for use in fire-proof building construction; and has for its object to produce an efficient and economical beam. To this end my invention comprises the combinations and details hereinafter set forth and claimed.

In the accompanying drawing—Figure 1 is an elevation of a portion of a building, partly in section, showing one of the beams constructed in accordance with my invention. Fig. 2 is a transverse section of a beam on the line 2 of Fig. 1. Fig. 3 is a transverse section of a joist constructed in accordance with my invention.

In carrying out my invention, I provide an outer metallic casing or envelop, comprising side members $b'$ and a bottom member $b^2$ of metallic plates. The side and bottom members may be made separate and connected together by suitable bracing members, such as angle bars $b^3$, or they may be made integral, as shown in Fig. 3, the latter being the preferable construction where a joist is to be formed. I provide suitable attaching flanges $b^4$. These may also be formed separate of angle bar, as shown in Fig. 2, or integral as shown in Fig. 3. The outer casing or envelop I fill with cement or other fire-proof plastic material, and extending through this cement or filling is a reinforcing element $d$, shown as a length of expanded metal, extending longitudinally of the beam and centrally thereof. Wooden blocks or strips $e$ may be embedded in the plastic material to form an attaching means for the floor $f$, permitting the insertion of nails or screws $g$.

My improved beam is exceedingly simple in construction, is firmly braced and supported by the expanded metal reinforcing element, and may be economically constructed.

I claim:

As a new article of manufacture, a fire proof beam comprising an outer casing or envelop, an inner filler of plastic material, a reinforcing strip of expanded sheet metal extending longitudinally through the plastic material and completely surrounded thereby, and a longitudinal element embedded in the plastic material for nailing purposes.

GEORGE W. BROOKS.

Witnesses:
   J. R. MOORE,
   G. L. BYBEE.